(12) United States Patent
Nakajima et al.

(10) Patent No.: US 9,787,230 B2
(45) Date of Patent: Oct. 10, 2017

(54) SYNCHRONOUS MOTOR CONTROL DEVICE FOR ELECTRIC AUTOMOBILE

(71) Applicant: NTN CORPORATION, Osaka (JP)

(72) Inventors: Akio Nakajima, Iwata (JP); Yingjie Zhang, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/807,553

(22) Filed: Jul. 23, 2015

(65) Prior Publication Data

US 2015/0333670 A1 Nov. 19, 2015

Related U.S. Application Data

(63) Continuation of application No. PCT/JP2014/051583, filed on Jan. 24, 2014.

(30) Foreign Application Priority Data

Jan. 31, 2013 (JP) ................... 2013-016441

(51) Int. Cl.
*H02P 21/00* (2016.01)
*H02P 6/10* (2006.01)
(Continued)

(52) U.S. Cl.
CPC .............. *H02P 6/10* (2013.01); *H02P 6/28* (2016.02); *H02P 21/05* (2013.01)

(58) Field of Classification Search
CPC ... G05B 19/404; G05B 19/19; H02P 21/0035; H02P 21/06
(Continued)

(56) References Cited

U.S. PATENT DOCUMENTS 7,474,067 B2 * 1/2009 Ueda ................... H02P 21/05
                                                                318/400.23
7,671,552 B2    3/2010 Tonami et al.
(Continued)

FOREIGN PATENT DOCUMENTS

CN       101133547 A    2/2008
CN       102300743 A    12/2011
(Continued)

OTHER PUBLICATIONS

PCT International Preliminary Report on Patentability dated Aug. 13, 2015 in corresponding International Patent Application No. PCT/JP2014/051583.
(Continued)

*Primary Examiner* — Rina Duda (57) ABSTRACT

A synchronous motor control device for an electric vehicle is provided which is able to reduce torque ripple through simple calculation and is excellent in practicability. In a synchronous motor control device which controls a traction synchronous motor, torque ripple compensation unit is provided which adds, to a motor drive current, a sine-wave correction current whose phase is opposite to that of torque ripple which is generated in the motor and has a frequency which is six times that of a rotation speed of the motor. Specifically, in the case of a configuration including a vector control type basic controller, the torque ripple compensation unit outputs a correction current command iq_c, and a value iq_ref obtained by adding the correction current command iq_c to a q-axis current command is used for control.

9 Claims, 5 Drawing Sheets

(51) Int. Cl.
    *H02P 21/05* (2006.01)
    *H02P 6/28* (2016.01)
(58) Field of Classification Search
    USPC .................................. 318/629, 632, 400.02
    See application file for complete search history.

(56)     References Cited

U.S. PATENT DOCUMENTS

| | | | |
|---|---|---|---|
| 7,768,220 B2* | 8/2010 | Schulz | ............... H02P 29/0038 |
| | | | 318/400.02 |
| 7,986,116 B2* | 7/2011 | Imura | ................ H02P 21/0003 |
| | | | 318/400.02 |
| 8,080,957 B2* | 12/2011 | Miura | .................... B62D 5/046 |
| | | | 318/400.01 |
| 8,446,118 B2 | 5/2013 | Kinugasa et al. | |
| 8,704,469 B2 | 4/2014 | Tadano | |
| 8,742,705 B2 | 6/2014 | Yoo | |
| 8,779,701 B2* | 7/2014 | Tobari | ..................... H02P 21/06 |
| | | | 318/400.02 |
| 2009/0021194 A1 | 1/2009 | Tonami et al. | |
| 2009/0251096 A1 | 10/2009 | Schulz et al. | |
| 2010/0244755 A1* | 9/2010 | Kinugasa | ............. B60L 15/025 |
| | | | 318/400.23 |
| 2011/0169369 A1 | 7/2011 | Liang et al. | |
| 2012/0306411 A1* | 12/2012 | Tadano | ................... H02P 21/05 |
| | | | 318/400.02 |
| 2013/0009575 A1 | 1/2013 | Yoo | |
| 2013/0099707 A1* | 4/2013 | Okubo | ................... B62D 5/046 |
| | | | 318/400.23 |

FOREIGN PATENT DOCUMENTS

| | | |
|---|---|---|
| CN | 102771043 A | 11/2012 |
| CN | 102868339 A | 1/2013 |
| JP | 64-039269 | 2/1989 |
| JP | 2007-267466 | 10/2007 |
| JP | 2009-106069 | 5/2009 |
| JP | 2010-39681 | 2/2010 |
| WO | WO 2006/106642 A1 | 10/2006 |

OTHER PUBLICATIONS

Japanese Notification of Reason(s) for Rejection dated Jun. 21, 2016 in corresponding Japanese Patent Application No. 2013-016441.
International Search Report mailed Apr. 15, 2014 in corresponding international application PCT/JP2014/051583.
Chinese Office Action dated Nov. 30, 2016 from Chinese Patent Application No. 201480005465.4, 8 pages.
Japanese Office Action dated Jan. 31, 2017 from Japanese Patent Application No. 2013-016441, 4 pages.
Extended and Supplementary European Search Report issued Nov. 14, 2016 for corresponding European Patent Application 14 74 5846.
Chinese Office Action dated Jul. 3, 2017 in related Chinese Application No. 201480005465.4.

\* cited by examiner

Fig. 1A

| $I_{ref}$ | TARGET CURRENT VALUE |
| --- | --- |
| $i$ | OBSERVED ARMATURE CURRENT |
| $\Delta i$ | RIPPLE REDUCTION COMPENSATION CURRENT |
| $T_e$ | MOTOR TORQUE |

SYNCHRONOUS MOTOR CONTROL DEVICE FOR ELECTRIC AUTOMOBILE

CROSS REFERENCE TO THE RELATED APPLICATION

This application is a continuation application, under 35 U.S.C. §111(a), of international application No. PCT/JP2014/051583, filed Jan. 24, 2014, which is based on and claims Convention priority to Japanese patent application No. 2013-016441, filed Jan. 31, 2013, the entire disclosure of which is herein incorporated by reference as a part of this application.

BACKGROUND OF THE INVENTION

Field of the Invention

The present invention relates to a synchronous motor control device for use in an electric motor for traction in an electric vehicle in which a running drive source is only the electric motor or a hybrid type electric vehicle equipped with the electric motor and an engine.

Description of Related Art

In electric vehicles, synchronous motors which are AC-driven permanent magnet motors such as an IPM (Inter Permanent Magnet) motor and an SPM (Surface Permanent Magnet) motor are often used as traction motors. These synchronous motors for the electric vehicle are driven by a vector control type inverter device in order to enhance the control performance thereof, but torque ripple generated due to the structure of the motor including a permanent magnet has a frequency which is six times that of a power supply frequency which occurs due to harmonic of field magnetic flux.

Figure 1A:
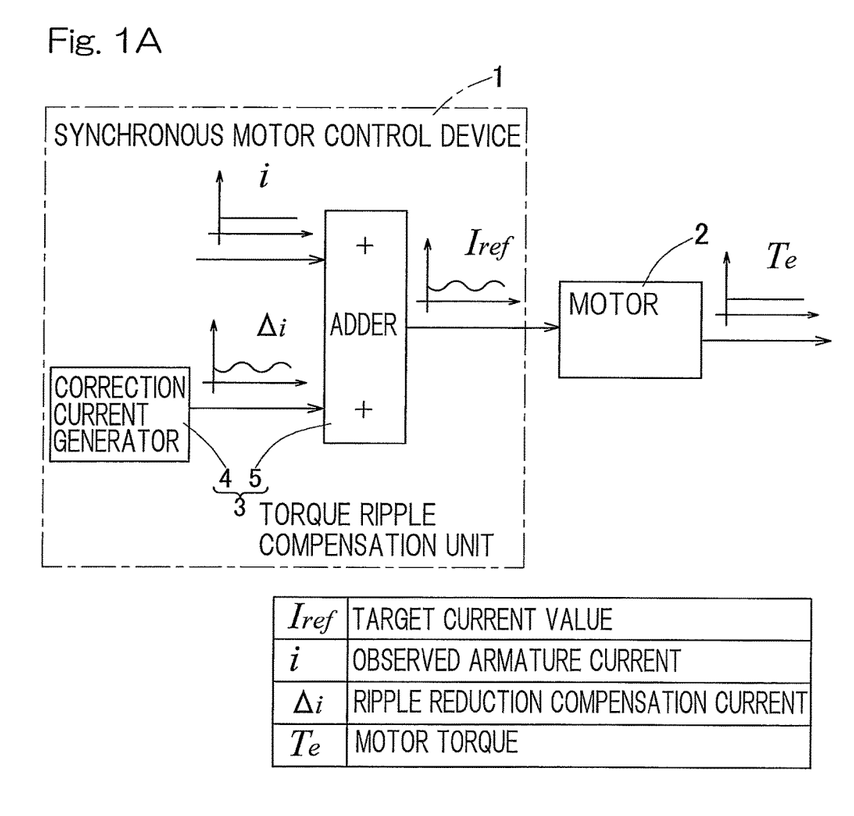
FIG. 1A is a block diagram showing an outline of a synchronous motor control device for an electric vehicle according to one embodiment of the present invention.
Figure 1B:
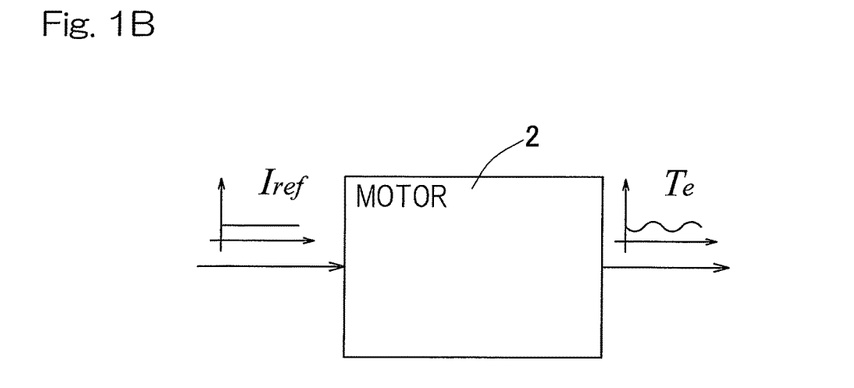
FIG. 1B is a block diagram for explaining a problem of conventional motor control.

Giving a description with reference to FIG. 1B, motor torque Te outputted in response to a target current value Iref supplied to a motor 2 includes torque ripple as schematically shown as a torque waveform.

If torque ripple occurs in the motor as described above, in the case of an electric vehicle, the torque ripple leads directly to vibrations of a vehicle body, which deteriorates the ride comfort.

As a technique to reduce torque ripple, it has been proposed to perform compensation of cancelling out torque ripple of IPM motor output, specifically, to add d-axis, q-axis current commands or a torque command according to a vector control theoretical model formula for the IPM motor (e.g., Patent Document 1).

RELATED DOCUMENT

Patent Document

[Patent Document 1] JP Laid-open Patent Publication No. 2007-267466

The technique to add a compensation signal according to the vector control theoretical model formula for the IMP motor in Patent Document 1 or the like is theoretically excellent. However, an amount of calculation is large, it is not easy to obtain each parameter, and thus the practicability is low. In particular, during running at an intermediate or high speed, in the case of calculation by using a complicated arithmetic formula as described above, the calculation cannot follow the running speed, and as a result, there arises a possibility that the added compensation signal inversely, against the purposes, becomes noise.

SUMMARY OF THE INVENTION

An object of the present invention is to provide a synchronous motor control device for an electric vehicle which is able to reduce torque ripple through simple calculation and is excellent in practicability.

Hereinafter, for convenience of easy understanding, a description will be given with reference to the reference numerals in embodiments.

A synchronous motor control device 1 for an electric vehicle according the present invention is the synchronous motor control device 1 supplying a motor drive current i corresponding to a motor drive command T to a traction synchronous motor 2. The synchronous motor control device 1 includes torque ripple compensation unit 3 configured to add, to the motor drive current i, a sine-wave correction current $\Delta i$ whose phase is opposite to that of torque ripple which is generated in the motor 2 and has a frequency which is six times that of a rotation speed of the motor 2. Due to this configuration, the synchronous motor control device 1 becomes a control device which is able to reduce torque ripple through simple calculation and is excellent in practicability.

Since the synchronous motor is an AC-driven permanent magnet motor, torque ripple having a frequency which is six times that of the motor rotation speed (frequency) occurs in the synchronous motor. The torque ripple has a frequency which is six times that of the motor rotation speed regardless of the number of magnetic poles or the like. On the other hand, the torque ripple compensation unit 3 adds, to the motor drive current i, the sine-wave correction current $\Delta i$ whose phase is opposite to that of the torque ripple which is generated in the synchronous motor 2 and has a frequency which is six times that of the motor rotation speed. Thus, the torque ripple is cancelled out by the correction current $\Delta i$. In addition, since the torque ripple compensation unit 3 adds the sine-wave correction current $\Delta i$ whose phase is opposite to that of the torque ripple, the synchronous motor control device 1 for an electric vehicle can simply perform the process at a high speed as compared to a conventional one which performs correction corresponding to a motor control theoretical model formula, and can effectively reduce the torque ripple with a simple configuration.

As described above, the synchronous motor control device 1 for an electric vehicle becomes a synchronous motor control device for an electric vehicle which is able to reduce torque ripple through simple calculation and is excellent in practicability.

Specifically, the synchronous motor control device 1 for an electric vehicle may include: a current command generator 8 configured to generate a current command having an AC waveform corresponding to the inputted motor drive command T; and a basic controller 9 configured to convert the current command outputted from the current command generator 8, into a three-phase AC motor drive current and supplies the three-phase AC motor drive current to the synchronous motor 2, and may be provided with the torque ripple compensation unit 3 which adds, to the current command to be inputted to the basic controller 9, a sine-wave correction current command whose phase is opposite to that of the torque ripple which is generated in the synchronous motor 2 and has a frequency which is six times that of the motor rotation speed.

The synchronous motor control device 1 for an electric vehicle according to the present invention may include: a q-axis current command generator 8a configured to generate a q-axis current command having an AC waveform corresponding to the inputted motor drive command T; a d-axis current command generator 8b configured to output a d-axis current command; and a vector control type basic controller 9 configured to convert a current command including the q-axis current command iq and the d-axis current command id outputted from the current command generators 8a, 8b, into a three-phase AC motor drive current and to supply the three-phase AC motor drive current to the synchronous motor 2, and the torque ripple compensation unit 3 may add the sine-wave correction current command iq_c to the q-axis current command iq.

Vector control is a control method in which a q-axis current (torque current) and a d-axis current (field current (also referred to as magnetic flux current)) are converted from the three phase motor current and independently controlled, thereby achieving high-speed response and high-accuracy control.

In the case where the correction current command is added, adding the correction current command to the q-axis current command iq is effective for reducing torque ripple.

In the synchronous motor control device 1 for an electric vehicle according to the present invention which is of a type of performing the above vector control, the torque ripple compensation unit 3 may determine the correction current command iq_c according to the following formula (1):

$$iq\_c = K\cos(6\theta + \alpha) \quad (1),$$

where K is a constant, $\theta$ is a motor rotation angle, and $\alpha$ is a phase compensation value.

Thus, the synchronous motor control device 1 for an electric vehicle achieves control of adding, to the motor drive current, the sine-wave correction current whose phase is opposite to that of the torque ripple.

In the synchronous motor control device 1 for an electric vehicle according to the present invention which is of a type of performing the above vector control, the torque ripple compensation unit 3 may perform predictive control of determining the correction current command iqc according to the following formula (2):

$$iq\_c = K\cos(6\theta + \alpha) \quad (2),$$

where K is a constant, $\theta'$ is a predicted angle after a one-sampling time for a motor rotation angle detection value, and $\alpha$ is a phase compensation value.

It should be noted that the predicted angle $\theta'$ is determined, for example, as $\theta' = \theta + \theta d$ by using an angular speed $\theta d$ obtained from a motor rotation angle $\theta$.

The control based on the above formula (1) is basic, but there is a possibility that delay of control may occur due to calculation. In contrast, the predictive control of determining the correction current command iq_c by using the predicted angle after the one-sampling time for a motor rotation angle detection value is performed, whereby the synchronous motor control device 1 for an electric vehicle can perform more effective torque ripple compensation without delay of control.

In the present invention, the torque ripple compensation unit 3 may be provided with a correction limiter 16 configured to stop output of the correction current command iq_c when the rotation speed of the synchronous motor 2 is equal to or higher than a set rotation speed.

Since the torque ripple has a frequency which is six times that of the motor rotation speed, when the motor rotation speed increases, it becomes difficult to calculate and generate a correction current command iq_c having the same frequency as that of the torque ripple. Thus, there is a possibility that, on the contrary, the correction current command iq_c becomes noise due to delay of calculation. Therefore, when the rotation speed of the motor increases to some extent, it is desirable to stop the output of the correction current command iq_c. The above-described "set rotation speed", which is a threshold for whether to output the correction current command iq_c, may be set as appropriate in accordance with the calculation processing capability of the control device 1 or the like.

In the present invention, the torque ripple compensation unit 3 may include a correction limiter 16 configured to cause the output of the correction current command iq_c to gradually approach zero as the rotation speed of the synchronous motor 2 increases in a range determined for the motor rotation speed.

As described above, when the motor rotation speed increases, it becomes difficult to calculate and generate a correction current command having the same frequency as that of the torque ripple. However, if the control for compensating for the torque ripple is suddenly stopped, an uncomfortable feeling may be provided to an occupant. On the other hand, when the output of the correction current command iq_c is caused to gradually approach zero as the rotation speed of the motor increases, it is possible to stop the control for compensating for torque ripple, without providing an uncomfortable feeling.

In the present invention, when the correction current command iq_c is determined according to the above formula (1) or (2), the constant K may be set as a function of the motor rotation speed or motor output torque. For example, K may be proportional to torque or (1/frequency).

The magnitude of generated torque ripple is different depending on the motor rotation speed or motor output torque. Thus, by setting the constant K as a function of the motor rotation speed or motor output torque as described above, it is possible to further effectively reduce the torque ripple.

In the present invention, when the correction current command iq_c is determined according to the above formula (1) or (2), the phase correction value $\alpha$ may be set as a function of the motor rotation speed or motor output torque.

An appropriate phase correction value is different depending on the relationship between the motor rotation speed or motor output torque or the like and a calculation time in the control device. Thus, by setting the phase correction value $\alpha$ as a function of the motor rotation speed or motor output torque, it is possible to further effectively reduce the torque ripple.

It should be noted that a process of setting the constant K as a function of the motor rotation speed, a process of setting the constant K as a function of the motor output torque, a process of setting the phase correction value $\alpha$ as a function of the motor rotation speed, and a process of setting the phase correction value $\alpha$ as a function of the motor output torque may be combined optionally.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Embodiments of the present invention will be described with reference to the drawings. As shown as an outline in FIG. 1A, a synchronous motor control device 1 for an electric vehicle is a device which supplies a motor drive current i corresponding to a motor drive command, to a traction synchronous motor 2 and in which a torque ripple compensation unit 3 is provided which adds, to the motor drive current i, a sine-wave correction current Δi whose phase is opposite to that of torque ripple which is generated in the motor 2 and has a frequency which is six times that of the rotation speed of the motor 2. The torque ripple compensation unit 3 includes: a correction current generator 4 which generates the correction current Δi; and an adder 5 which adds the generated correction current Δi to the motor drive current i so as to generate a target current Iref. The motor 2 is an AC-driven permanent magnet motor such as an IPM motor or an SPM motor.

Figure 2:
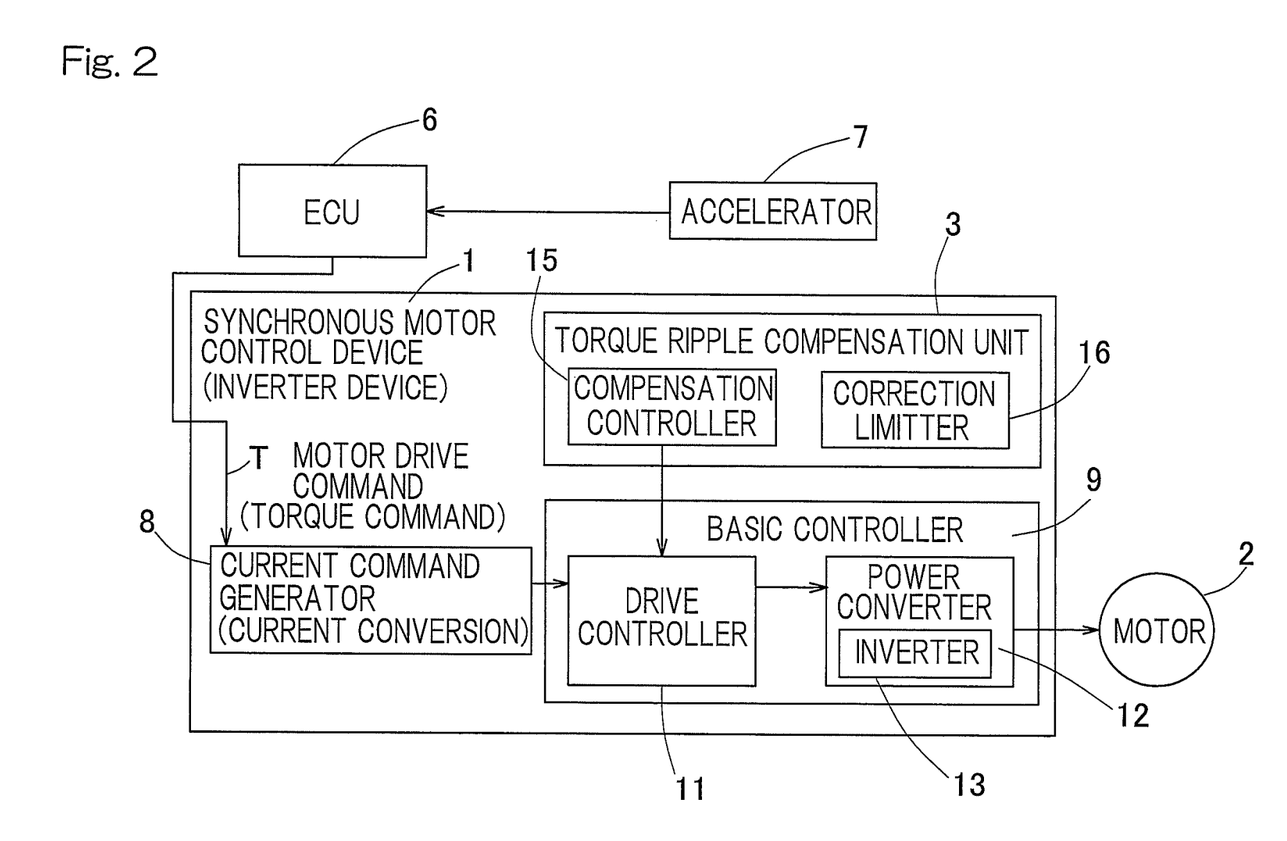
FIG. 2 is a block diagram showing the configurations of the entire synchronous motor control device of the embodiment and its surroundings.

In order to describe the outline, FIG. 1A illustrates the adder 5 such that the adder adds the motor drive current i and the correction current Δi as currents per se. However, specifically, as shown in FIG. 2 and the subsequent drawings, a current command may be added with a correction current command before power conversion, and the power conversion may be performed in accordance with the added current command, whereby, as a result, the motor drive current i may be added with the correction current Δi.

An operation will be described. Since the motor 2 is the AC-driven permanent magnet motor, torque Te outputted in response to the target current Iref which is inputted to the motor 2 includes torque ripple as shown in FIG. 1B. The torque ripple has a frequency which is six times that of the motor rotation speed regardless of the number of magnetic poles or the like.

On the other hand, the torque ripple compensation unit 3 adds, to the motor drive current i, the sine-wave correction current Δi whose phase is opposite to that of the torque ripple which is generated in the motor 2 and has a frequency which is six times that of the motor rotation speed. Thus, the torque ripple is cancelled out by the correction current Δi. In addition, since the torque ripple compensation unit 3 adds the sine-wave correction current whose phase is opposite to that of the torque ripple, the process can be simply performed at a high speed as compared to a conventional one which performs correction corresponding to a motor control theoretical model formula, and it is possible to effectively reduce the torque ripple with a simple configuration.

As described above, a motor control device for an electric vehicle is provided which is able to reduce torque ripple through simple calculation and is excellent in practicability.

In FIG. 2, specifically, the synchronous motor control device 1 for the electric vehicle is including an inverter device which is subordinate control device with respect to a main ECU (electric control unit) 6 in the electric vehicle. The synchronous motor control device 1 for the electric vehicle, which is including the inverter device, includes: a current command generator 8 which generates a current command having an AC waveform corresponding to the inputted motor drive command T; and a basic controller 9 which converts the current command outputted from the current command generator 8, into a three-phase AC motor drive current and supplies the three-phase AC motor drive current to the motor 2. The motor drive command T is supplied from the ECU 6 to the current command generator 8, as a torque command corresponding to an amount by which an accelerator 7 is operated. The current command generator 8 converts the torque command into a current command. The basic controller 9 includes: a drive controller 11 which performs various controls in accordance with the inputted current command and a state of the motor 2 to generate each phase command as a voltage value; and a power converter 12 which performs power conversion of the generated each phase command and supplies the converted command to the motor 2. The power converter 12 includes: an inverter 13 which includes a plurality of switching elements and converts DC power of a battery (not shown) into AC power; and a PWM driver (not shown) which performs PWM control of the inverter 13.

In this basic configuration, the torque ripple compensation unit 3 is provided which adds a correction current command to the current command inputted from the current command generator 8 to the basic controller 9. The correction current command outputted by the torque ripple compensation unit 3 is a sine-wave current command whose phase is opposite to that of the torque ripple which is generated in the motor 2 and has a frequency which is six times that of the motor rotation speed. The torque ripple compensation unit 3 includes: a compensation controller 15 which generates the correction current command; and a correction limitter 16 which limits that the compensation controller 15 outputs the command.

Figure 3:
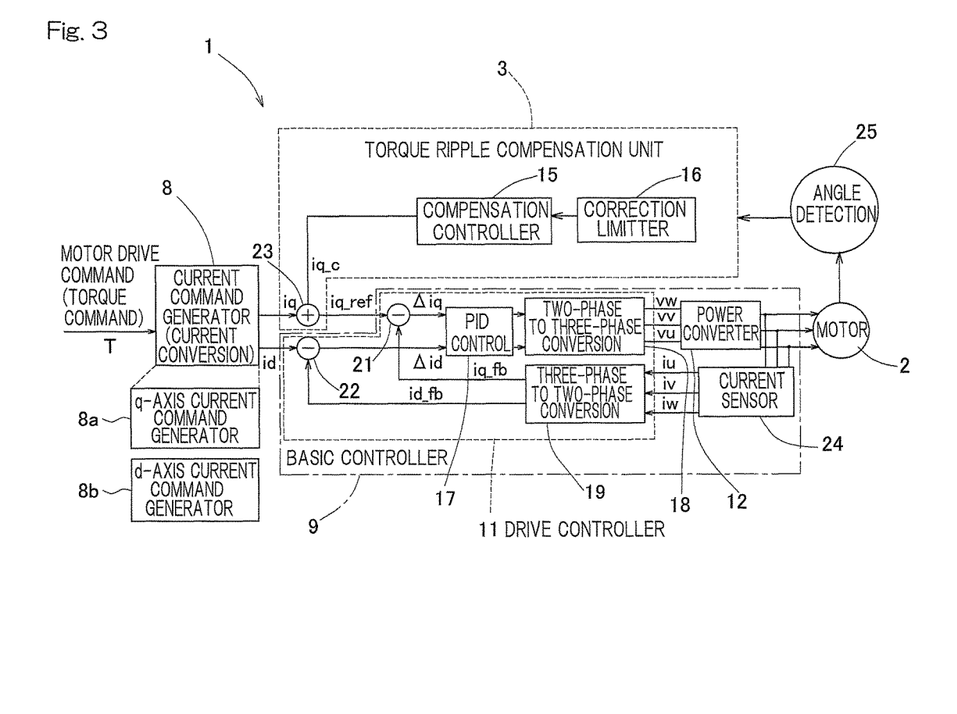
FIG. 3 is a block diagram showing a specific configuration example of the synchronous motor control device.

The drive controller 11 of the basic controller 9 performs vector control, and the current command generator 8 and the drive controller 11 are configured, for example, as shown in FIG. 3.

The current command generator 8 is converter configured to convert the motor drive command T which includes the inputted torque command, into a q-axis current command iq and a d-axis current command id, and includes a q-axis current command generator 8a and a d-axis current command generator 8b. The q-axis current command generator 8a performs current conversion of the motor drive command T, which includes the inputted torque command, and outputs the q-axis current command iq. The d-axis current command generator 8b outputs a constant d-axis current command id (e.g., zero) which is set as appropriate, or outputs a d-axis current command id having a magnitude corresponding to the inputted motor drive command T.

The drive controller 11 of the basic controller 9 includes a PID controller 17 which is deviation corresponding controller, a two-phase to three-phase converter 18, a three-phase to two-phase converter 19, a q-axis subtracter 21, and a d-axis subtracter 22.

In the drive controller 11, basically, the three-phase to two-phase converter 19 performs three-phase to two-phase conversion of respective three-phase current values detected by a current sensor 24 attached to the motor 2, to obtain q-axis and d-axis two-phase detection currents iq_fb, id_fb. Differences Δiq, Δid between these detection currents iq_fb, id_fb and a later-described corrected q-axis current command iq_ref, which is calculated from the q-axis current command iq outputted from the current command generator 8, and the d-axis current command id are obtained by the q-axis subtracter 21 and the d-axis subtracter 22. The PID controller 17 performs proportional, integral and differential (PID) control with the differences Δiq, Δid. Since output of the PID controller 17 has two phases, voltage command values VW, VV, VU of the respective phases for driving the three-phase motor 2 are obtained by the two-phase to three-phase converter 18 and outputted to the power converter 12.

The synchronous motor control device 1 includes such a basic controller 9 and is configured with the torque ripple compensation unit 3 provided therewith. The correction current command iq_c generated by the compensation controller 15 of the torque ripple compensation unit 3 is added by an adder 23 to the q-axis current command iq outputted from the current command generator 8. In the case where the torque ripple compensation unit 3 is provided as in this embodiment, the q-axis subtracter 21 obtains the difference Δiq of this added corrected q-axis current command iq_ref from the detection current iq_fb, and the PID controller 17 performs PID control.

The compensation controller 15 of the torque ripple compensation unit 3 is generator configured to generate the correction current command iq_c which is a sine wave whose phase is opposite to that of the torque ripple which is generated in the motor 2 and has a frequency which is six times that of the motor rotation speed. Specifically, the compensation controller 15 is configured as shown in FIG. 4 or FIG. 5.

Figure 4:
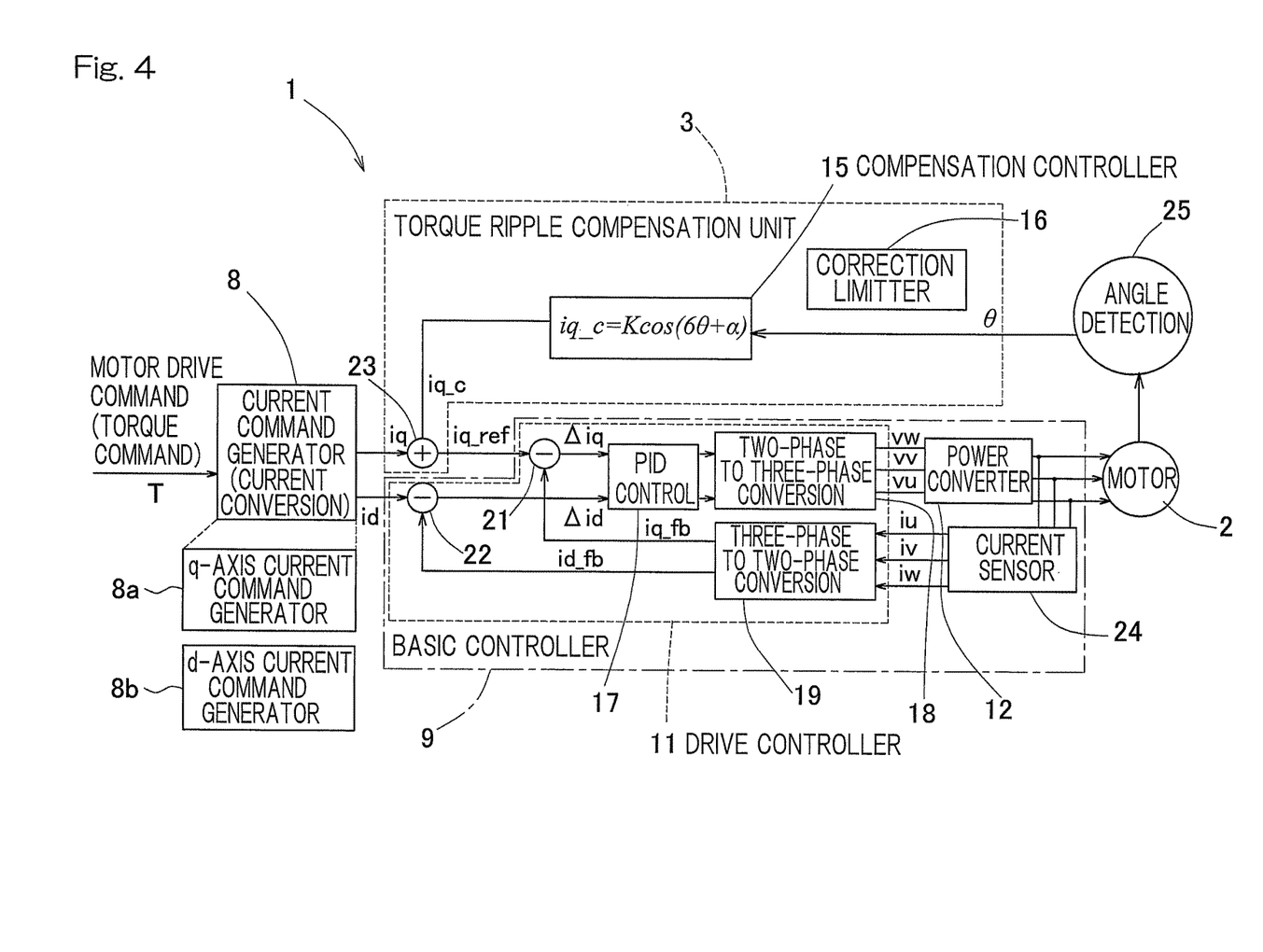
FIG. 4 is a block diagram showing a specific example of torque ripple compensation unit in the control device having the configuration of FIG. 3.
Figure 5:
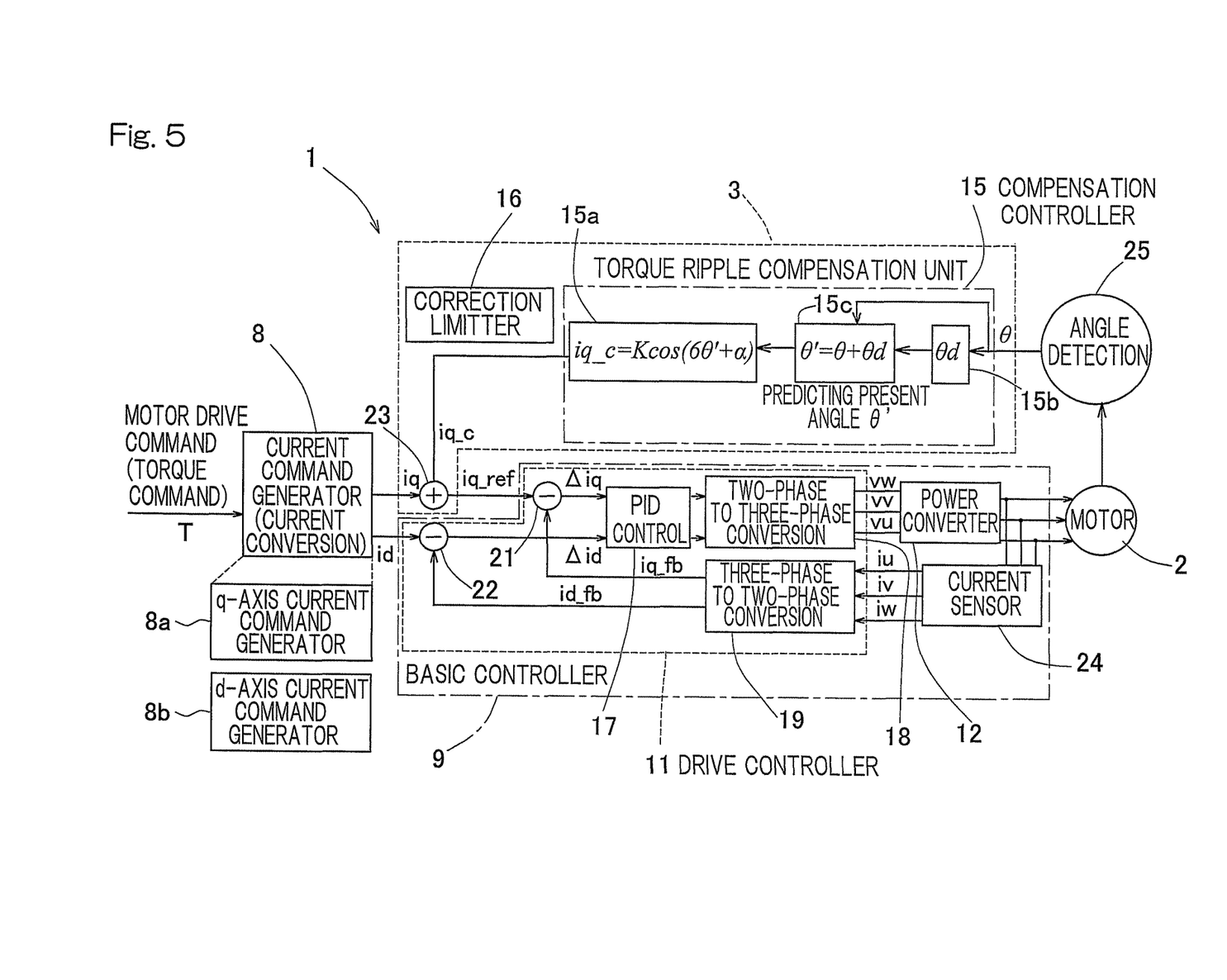
FIG. 5 is a block diagram showing another specific example of the torque ripple compensation unit in the control device having the configuration of FIG. 3.

In the example shown in FIG. 4, the compensation controller 15 generates the correction current command iq_c according to the following formula (1):

$$iq\_c = K \cos(6\theta + \alpha) \quad (1),$$

where K is a constant, θ is a motor rotation angle, and α is a phase compensation value. The motor rotation angle θ is obtained from an angle detector 25 attached to the motor 2.

In the synchronous motor control device 1 of this embodiment, as described above, the sine-wave correction current whose phase is opposite to that of the torque ripple which is generated in the motor 2 and has a frequency which is six times that of the motor rotation speed is added to the motor drive current by the torque ripple compensation unit 3. Thus, the torque ripple is cancelled out by the correction current. In addition, since the torque ripple compensation unit 3 adds the sine-wave correction current whose phase is opposite to that of the torque ripple, the process can be simply performed at a high speed as compared to a conventional one which performs correction corresponding to a motor control theoretical model formula, and it is possible to effectively reduce the torque ripple with a simple configuration. As described above, a synchronous motor control device for an electric vehicle is provided which is able to reduce torque ripple through simple calculation and is excellent in practicability.

In the embodiment of FIG. 5, a dead time of control is taken into consideration in order to further increase the accuracy of calculation. That is, in the compensation controller 15, an angular speed θd is obtained by a differentiator 15b from a rotation angle θ obtained by the angle detector 25, and is added to the present rotation angle θ by a prediction unit 15c, whereby feedforward control is performed such that a rotation angle θ' after one sampling of the angle detector 25 is predicted.

The correction current command iq_c is calculated by a calculator 15a using the thus predicted angle θ' described above according to the following formula (2):

$$iq\_c = K \cos(6\theta + \alpha) \quad (2),$$

where K is a constant, θ' is a predicted angle after a one-sampling time for a motor rotation angle detection value, and α is a phase compensation value. The calculator 15a performs predictive control of determining the correction current command iq_c.

The control based on the above formula (1) is basic, but there is a possibility that delay of control may occur due to calculation. In contrast, the predictive control of determining the correction current command iq_c by using the predicted angle after the one-sampling time for a motor rotation angle detection value is performed, whereby more effective torque ripple compensation can be performed without delay of control.

When the correction current command iq_c is determined according to the above formula (1) or (2), the constant K may be set as a function of the motor rotation speed (frequency) or motor output torque. For example, the constant K may be proportional to torque or (1/frequency).

The magnitude of generated torque ripple is different depending on the motor rotation speed or motor output torque. Thus, by setting the constant K as a function of the motor rotation speed or motor output torque as described above, it is possible to further effectively reduce the torque ripple.

When the correction current command iq_c is determined according to the above formula (1) or (2), the phase correction value α may be set as a function of the motor rotation speed or motor output torque.

An appropriate phase correction value is different depending on the relationship between the motor rotation speed or motor output torque or the like and a calculation time in the control device. Thus, by setting the phase correction value α as a function of the motor rotation speed or motor output torque, it is possible to further effectively reduce the torque ripple.

In addition, the correction by the torque ripple compensation unit 3 may be limited by the correction limiter 16 as follows. For example, the correction limiter 16 stops the output of the correction current command when the rotation speed of the motor 2 is equal to or higher than a set rotation speed.

Since the torque ripple has a frequency which is six times that of the motor rotation speed, when the motor rotation speed increases, it becomes difficult to calculate and generate a correction current command having the same frequency as that of the torque ripple. Thus, there is a possibility that, on the contrary, the correction current command becomes noise due to delay of calculation. Therefore, when the rotation speed of the motor increases to some extent, it is desirable to stop the output of the correction current command. The above-described "set rotation speed", which is a threshold for whether to output the correction current command, may be set as appropriate in accordance with the performance of the control device or the like. The set rotation speed is, for example, a value determined as appropriate in the range of 1500 to 2500 (1/min).

In addition, the correction limitter 16 may cause the output of the correction current command iq_c to gradually approach zero as the rotation speed of the motor 2 increases in a range determined for the motor rotation speed. In this case as well, it is desirable to stop the output of the correction current command when the rotation speed of the motor 2 is equal to or higher than the set rotation speed.

As described above, when the motor rotation speed increases, it becomes difficult to calculate and generate a correction current command having the same frequency as that of the torque ripple. However, if the control for compensating for the torque ripple is suddenly stopped, an uncomfortable feeling may be provided to an occupant. On the other hand, when the output of the correction current command is caused to gradually approach zero as the rotation speed of the motor 2 increases, it is possible to stop the control for compensating for torque ripple, without providing an uncomfortable feeling.

Although the preferred embodiments have been described above with reference to the drawings, those skilled in the art will readily conceive various changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

1 . . . synchronous motor control device
2 . . . motor
3 . . . torque ripple compensation unit
6 . . . ECU
8 . . . current command generator
9 . . . basic controller
11 . . . drive controller
12 . . . power converter
15 . . . compensation controller
16 . . . correction limitter

What is claimed is:

1. A synchronous motor control device for an electric vehicle, the synchronous motor control device supplying a motor drive current corresponding to a motor drive command to a traction synchronous motor, the synchronous motor control device comprising:
a q-axis current command generator configured to generate a q-axis current command having an AC waveform corresponding to the inputted motor drive command;
a d-axis current command generator configured to output a d-axis current command;
a torque ripple compensation unit configured to add to only the q-axis current command a sine-wave correction current whose phase is opposite to that of torque ripple which is generated in the motor and has a frequency which is six times that of a rotation speed of the motor to output a correction q-axis current command; and
a vector control type basic controller configured to convert a current command including the correction q-axis current command and the d-axis current command into a three-phase AC motor drive current and to supply the three-phase AC motor drive current to the synchronous motor.

2. The synchronous motor control device for an electric vehicle as claimed in claim 1, wherein the torque ripple compensation unit determines the correction current command iq_c according to the following formula (1):

$$iq\_c = K \cos(6\theta + \alpha) \quad (1),$$

where K is a constant, $\theta$ is a motor rotation angle, and $\alpha$ is a phase compensation value.

3. The synchronous motor control device for an electric vehicle as claimed in claim 1, wherein the torque ripple compensation unit performs predictive control of determining the correction current command iq_c according to the following formula (2):

$$iq\_c = K \cos(6\delta' + \alpha) \quad (2),$$

where K is a constant, $\theta'$ is a predicted angle after a one-sampling time for a motor rotation angle detection value, and $\alpha$ is a phase compensation value.

4. The synchronous motor control device for an electric vehicle as claimed in claim 3, wherein the predicted angle $\theta'$ is determined as $\theta' = \theta + \theta d$ by using an angular speed $\theta d$ obtained from a motor rotation angle $\theta$.

5. The synchronous motor control device for an electric vehicle as claimed in claim 1, wherein the torque ripple compensation unit includes a correction limitter configured to stop output of the correction current command when the rotation speed of the motor is equal to or higher than a set rotation speed.

6. The synchronous motor control device for an electric vehicle as claimed in claim 1, wherein the torque ripple compensation unit includes a correction limitter configured to cause the output of the correction current command to gradually approach zero as the rotation speed of the motor increases in a range determined for the motor rotation speed.

7. The synchronous motor control device for an electric vehicle as claimed in claim 2, wherein the constant K is set as a function of the motor rotation speed or motor output torque.

8. The synchronous motor control device for an electric vehicle as claimed in claim 7, wherein the constant K is set as a function inversely proportional to the motor rotation speed or a function proportional to the motor output torque.

9. The synchronous motor control device for an electric vehicle as claimed in claim 2, wherein the phase correction value $\alpha$ is set as a function of the motor rotation speed or motor output torque.

* * * * *

UNITED STATES PATENT AND TRADEMARK OFFICE
CERTIFICATE OF CORRECTION

PATENT NO.        : 9,787,230 B2
APPLICATION NO.   : 14/807553
DATED             : October 10, 2017
INVENTOR(S)       : Akio Nakajima et al.

Page 1 of 1

It is certified that error appears in the above-identified patent and that said Letters Patent is hereby corrected as shown below:

In the Claims

Column 10, Line 26:
In Claim 3, delete "$iq\_c = K\cos(6\delta'+\alpha)$" and insert -- $iq\_c = K\cos(6\theta'+\alpha)$ --, therefore.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*